(12) United States Patent
Arthur et al.

(10) Patent No.: US 7,678,180 B2
(45) Date of Patent: Mar. 16, 2010

(54) INTEGRAL FUEL CARTRIDGE AND FILTER

(75) Inventors: Alan R Arthur, Salem, OR (US); John H. Dion, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 163 days.

(21) Appl. No.: 11/977,567

(22) Filed: Oct. 24, 2007

(65) Prior Publication Data

US 2008/0127829 A1 Jun. 5, 2008

Related U.S. Application Data

(62) Division of application No. 10/661,153, filed on Sep. 12, 2003, now Pat. No. 7,306,641.

(51) Int. Cl.
*B01D 46/00* (2006.01)
(52) U.S. Cl. .................. 95/273; 95/287; 55/385.1; 29/700
(58) Field of Classification Search ............... 95/273, 95/287; 55/385.1; 29/700
See application file for complete search history.

(56) References Cited

U.S. PATENT DOCUMENTS

2004/0023096 A1* 2/2004 Pratt et al. ................. 429/34

* cited by examiner

*Primary Examiner*—Jason M Greene
*Assistant Examiner*—Karla Hawkins

(57) ABSTRACT

An integral fuel cartridge and filter apparatus includes a fuel cartridge, a filter housing coupled to the fuel cartridge, and a filter coupled to the filter housing.

31 Claims, 10 Drawing Sheets

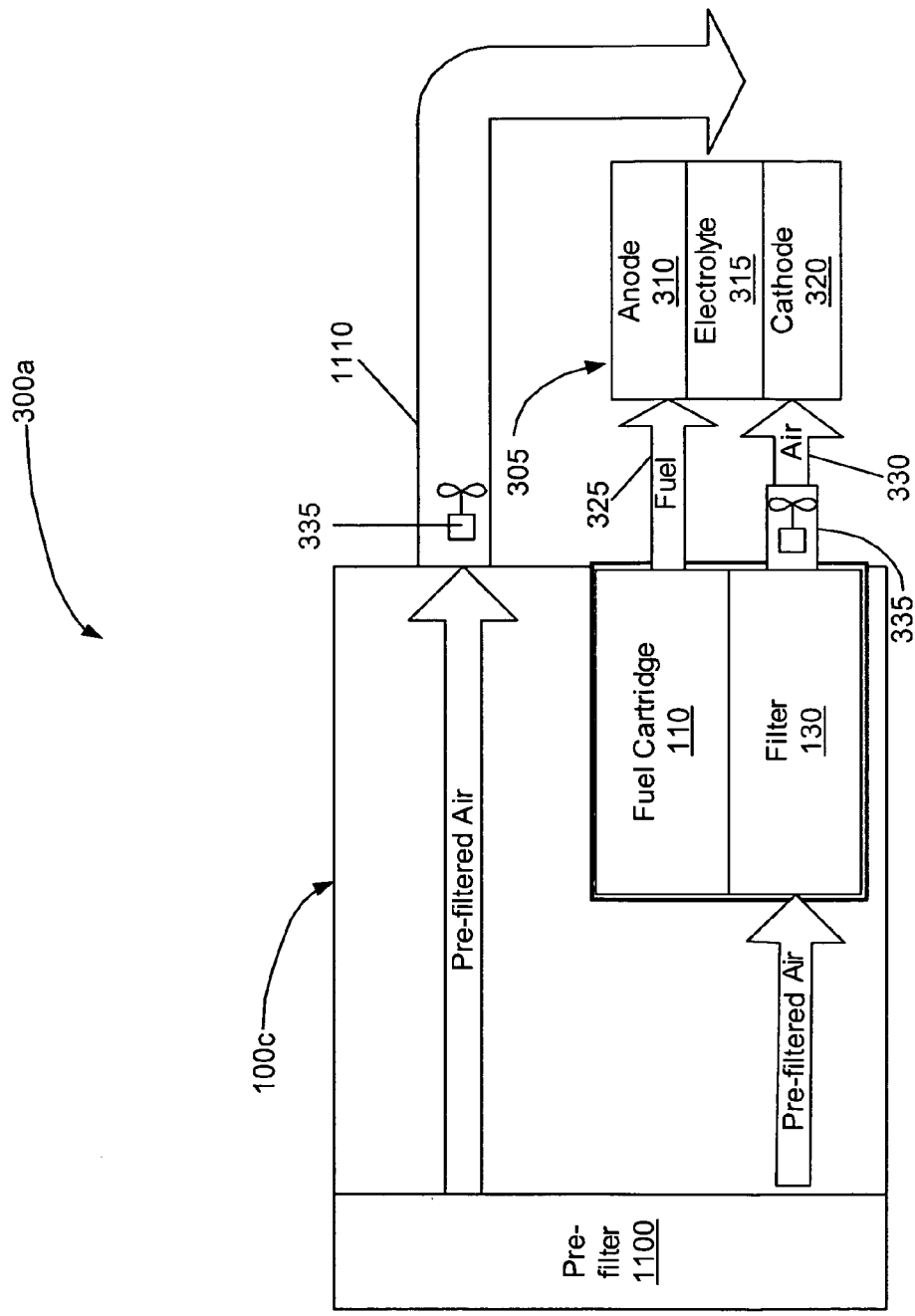

INTEGRAL FUEL CARTRIDGE AND FILTER

CROSS-REFERENCE TO RELATED APPLICATION

This application is a divisional of prior application Ser. No. 10/661,153, filed on Sep. 12, 2003 now U.S. Pat. No. 7,306,641, the contents of which are incorporated herein by reference.

BACKGROUND

During the past several years, the popularity and viability of fuel cells for producing both large and small amounts of electricity has increased significantly. Fuel cells use an electrochemical reaction with reactants such as hydrogen and oxygen to produce electricity and heat. Fuel cells are similar to batteries except that fuel cells can be "recharged" while providing power. In addition, fuel cells are cleaner than other sources of power, such as devices that combust hydrocarbons.

Fuel cells provide a direct current (DC) that may be used to power motors, lights, computers, or any number of electrical appliances. A typical fuel cell includes an electrolyte disposed between two electrodes: an anode and a cathode. There are several different types of fuel cells, each having a different chemistry. Fuel cells are usually classified into one of five groups by the type of electrolyte used: proton exchange membrane (PEM) fuel cells, alkaline fuel cells (AFC), phosphoric-acid fuel cells (PAFC), solid oxide fuel cells (SOFC), and molten carbonate fuel cells (MCFC).

When an oxidant such as air is fed to the cathode, the cathode uses the oxidant to supply oxygen ions to the electrolyte. A fuel such as hydrogen or methane is also fed to the anode where it is transported to the electrolyte to react with the oxygen ions. This electrochemical reaction liberates electrons, which are then introduced into an external circuit to provide useful power.

Fuel cell systems typically require large quantities of cathode air to support the electrochemical processes. This air is typically drawn from the ambient environment. However, if ambient dust and dirt are also ingested into the fuel cell, these contaminants have detrimental effects on the system. To avoid these effects, filters are typically installed on the air intake for the cathode air stream. These filters typically require regular replacement in order to be effective.

Specifically, if the air filter is not regularly replaced, it may adversely affect the operation of the system's "air movers," the devices that draw air from the ambient environment and provide air to the fuel cell. These devices are known as 'air movers.' These air movers are typically capable of generating only small amounts of pressure to overcome head losses associated with the system, which includes, but is not limited to, clogging in the air filter. To complicate the matter, flow geometry in some systems is often designed to be small in an attempt to miniaturize the system. A small flow geometry increases the pressure drop of the system and thus makes the pressure drop budget of the overall system a premium.

While needed for operation of the system, the use of a filter is also one obstacle to consumer compatible solutions because of the additional maintenance required. As mentioned, filters must be regularly maintained or replaced in order to prevent build-up on the filter from interfering with the air movers' ability to provide adequate air pressure to the fuel cell system. For the user, this would an inconvenience as it requires another item that must be provided and maintained in order to use the product. For the user that neglects the system and does not replace the filter, the pressure drop would increase and jeopardize the proper functioning of the system.

SUMMARY

An integral fuel cartridge and filter apparatus includes a fuel cartridge, a filter housing coupled to the fuel cartridge, and a filter coupled to the filter housing.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

FIG. 10 illustrates a schematic view of a fuel cell system that makes use of an integral fuel cartridge and filter apparatus according to one exemplary embodiment.

Throughout the drawings, identical reference numbers designate similar, but not necessarily identical, elements.

DETAILED DESCRIPTION

The present specification describes an integral fuel cartridge and filter apparatus includes a fuel cartridge, a filter housing coupled to the fuel cartridge, and a filter coupled to the filter housing. The housing may also include a handle to facilitate use of the unit. As used herein, a handle shall broadly be any device, mechanism, or part that facilitates manipulation, coupling, or removal operations.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification does not necessarily refer to the same embodiment.

Exemplary Structure

Figure 1A:
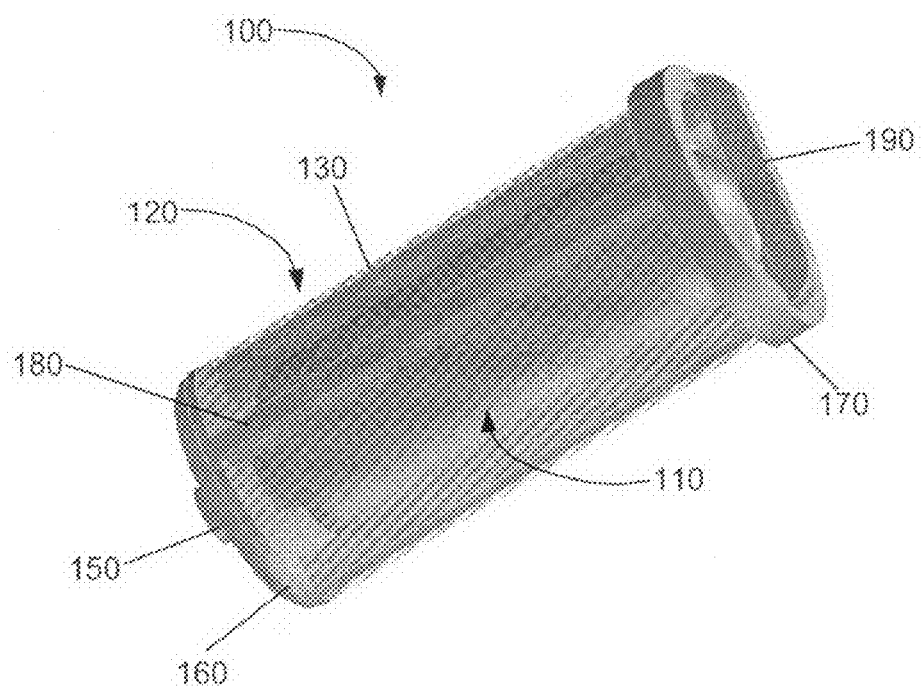
FIG. 1A illustrates a perspective view of an integral fuel cartridge and filter apparatus according to one exemplary embodiment.
Figure 1B:
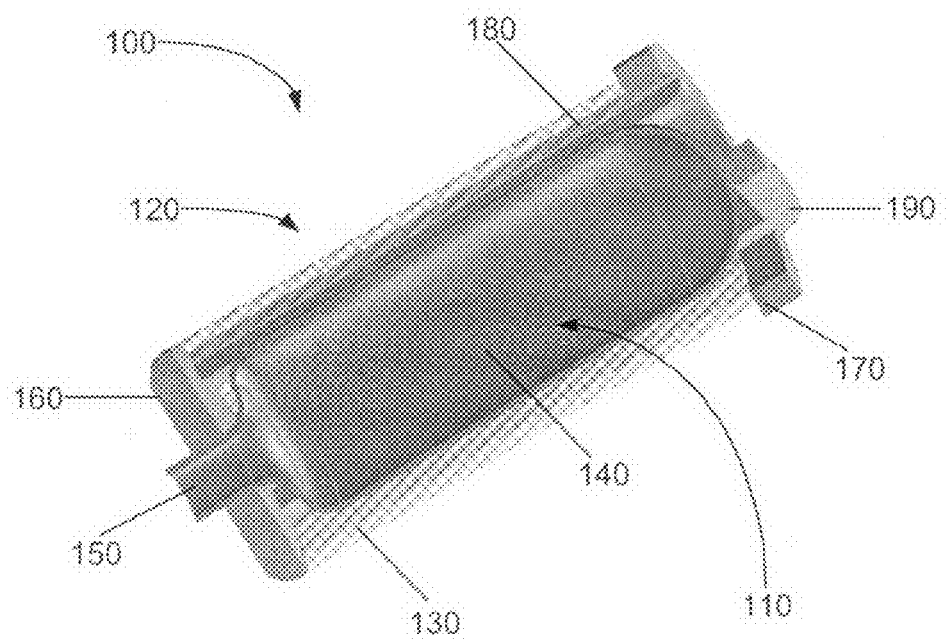
FIG. 1B illustrates a partial cross sectional view of an integral fuel cartridge and filter apparatus according to one exemplary embodiment.

FIGS. 1A and 1B illustrate an integral fuel cartridge and filter apparatus (100) that generally includes a fuel cartridge (110), a filter housing (120), and an air filter (130). The fuel cartridge (110) includes a fuel cylinder (140, FIG. 1B) and a fitting (150). The filter housing (120) includes proximal end member (160) and distal end member (170). Rib members (180) extend between the end members (160, 170). The filter housing (120) is coupled to the fuel cartridge (110). The air filter (130) is coupled to the outer portion of the filter housing (120) and partially surrounds the fuel cartridge (110). Accordingly, the fuel cartridge (110), filter housing (120), and the air filter (130) form an integral apparatus that can be coupled and removed from other systems as an integral member.

Figure 3:
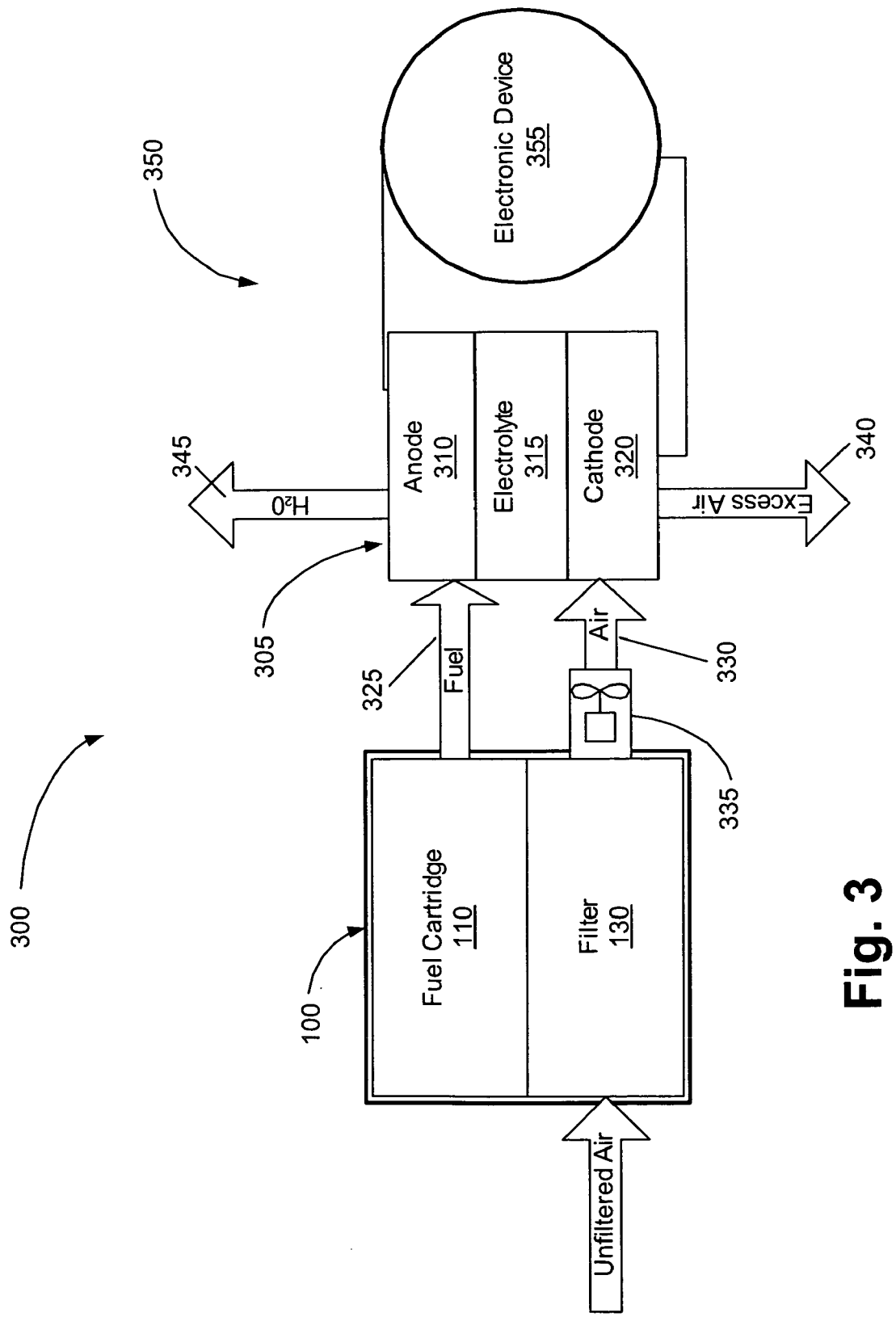
FIG. 3 is a schematic of a fuel cell system according to one exemplary embodiment.

A handle (190) is coupled to the distal end member (170) of the filter housing (120). The handle (190) facilitates the coupling, removal and manipulation of the integral fuel cartridge and filter apparatus (100) with respect to a system, such as a fuel cell system (30Q; FIG. 3). By twisting the handle (190) with respect to a fuel cell system, the fuel cartridge (110) may sealingly engage a fuel cell system (300; FIG. 3) and lock the integral fuel cartridge and filter apparatus (100) with respect to the fuel cell system. Similarly, the handle may facilitate disengagement and removal of the integral fuel cartridge and filter apparatus (100) from the fuel cell system (300; FIG. 3). Operation of the fuel cell system will be discussed in more detail with reference to FIG. 3.

With the filter and fuel cartridge integrated into a single unit, replacement of the filter occurs automatically each time the fuel cartridge is emptied and replaced. Consequently, the time and effort required to service a system are reduced.

Exemplary Implementation and Operation

Figure 2:
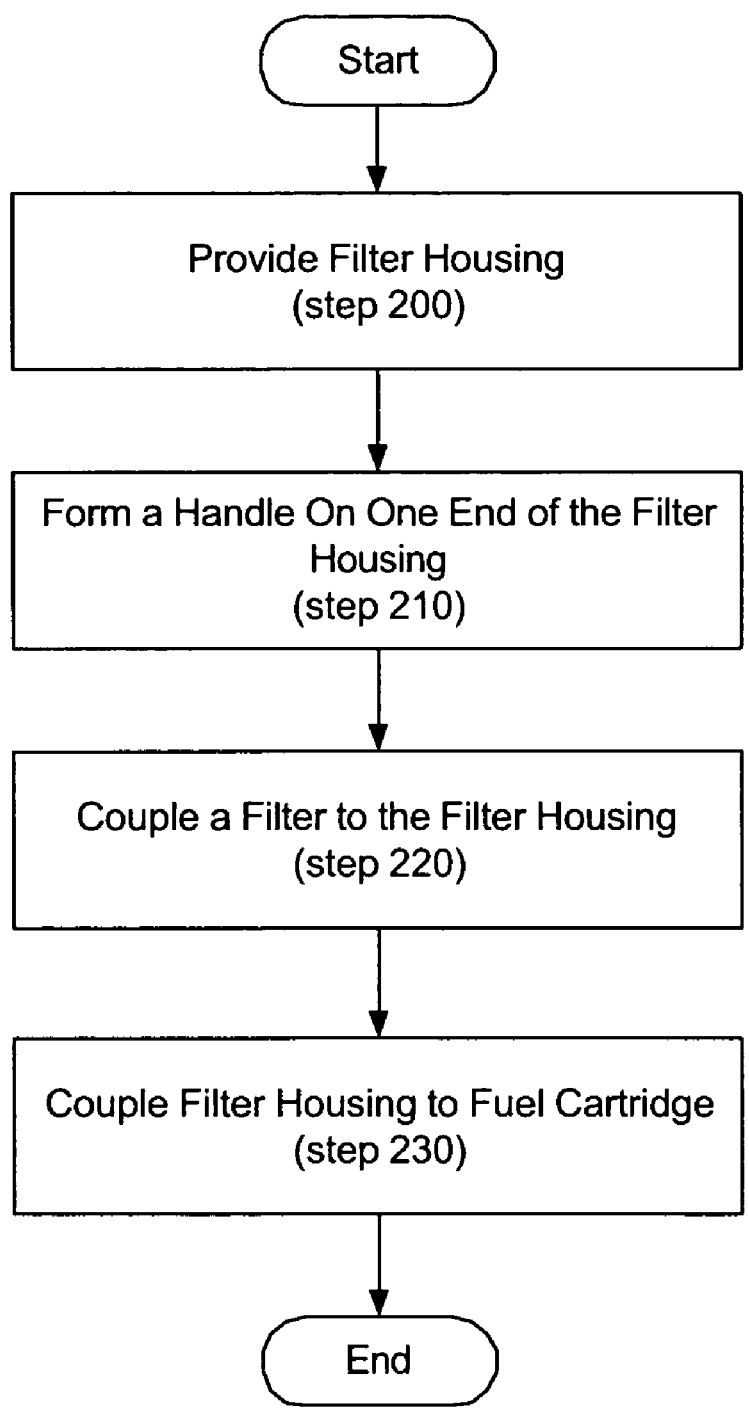
FIG. 2 is a flowchart of a method of forming an integral fuel cartridge and filter apparatus according to one exemplary embodiment.

FIG. 2 is a flowchart illustrating a method of forming an integral fuel cartridge and filter apparatus. The process begins by providing a filter housing (step 200). The filter housing may be of any suitable structural material, such as plastic or metal. In some embodiments, the filter housing is formed with distal and proximal end members in which separator ribs extend between the distal and proximal end members. The distal and proximal end members and the separator ribs form an annular or cylindrical filter housing that surrounds the fuel cartridge. In addition, a handle may be formed on, or attached to, the distal end of the filter housing (step 210). The handle facilitates the coupling, removal and manipulation of the integral fuel cartridge and filter apparatus with respect to a system, such as a fuel cell system.

Next, a filter is coupled to the filter housing (step 220). This coupling may occur as a co-molding process in which the filter and filter housing are integrally formed in a molding process. Additionally, the coupling may be accomplished by heat staking the filter to the filter housing. The filter material may be any type of filtering media that provides the filtering required without excessive pressure drop. Examples of such materials may include, but are not limited to, spun glass/plastic, a metal fiber, a plastic fiber, expanded foam-like filter material, paper like material, or cloth material. In some embodiments, the filter is configured to filter dirty, ambient air before it enters a fuel cell system. Once the filter is coupled to the filter housing (step 220), the filter and filter housing are then coupled to a fuel cartridge (step 230). The fuel cartridge may be any vessel capable of containing a fuel suitable for use in, for example, a fuel cell.

In the embodiment illustrated above, the integral fuel cartridge and filter apparatus includes a spun glass/plastic filter around the inner fuel cartridge. The filter is held in place by a plastic porous mesh that is either part of the filter housing or attached to the filter housing. Thus, the present method provides for forming an integral fuel cartridge and filter apparatus. Accordingly, use of an integral fuel cartridge and filter apparatus allows for the simultaneous introduction or replacement and removal of a fuel cartridge and a filter together in an integral member. This minimizes the number of steps and time required to maintain a fuel cell or similar system in operating condition, thereby facilitating consumer applications.

FIG. 3 illustrates a schematic view of a fuel cell system (300) according to one exemplary embodiment. Once the integral fuel cartridge and filter apparatus (100) has been coupled to the fuel cell system (300), fuel is provided to a fuel cell (305) from the fuel cylinder (140; FIG. 1) of the fuel cartridge (110) through the fitting (150; FIG. 1). Similarly, once the integral fuel cartridge and filter apparatus (100) has been coupled to the fuel cell system (300) air is also routed to the fuel cell (305) through the filter (130). Accordingly, intake air is drawn through the relatively large surface area of the filter (130), thereby maximizing the efficiency of the intake system by minimizing pressure drop due to filtering. The fitting (150; FIG. 1) may be threaded so as to interface with a corresponding threaded portion (not shown) in the fuel cell system (300). The specific details of the fuel cell (305) will be discussed in more detail below.

The fuel cell system (300) generally includes the fuel cell (305) having an anode (310), an electrolyte (315), and a cathode (320). The fuel cell (305) is fluidly coupled to the integral fuel cartridge and filter apparatus (100). Fuel (325) is provided by the fuel cartridge (110) to the anode (310). Similarly, air (330) is routed through the filter (130) and driven through the fuel cell (305) by an air mover such as a fan or blower (335) to the cathode (320).

The cathode (320) forms oxygen ions from the incoming air (330). The electrolyte (315), located between the anode (310) and the cathode (320), conducts those oxygen ions from the cathode side to the anode side where those ions react with fuel (325) from the anode (310). The reaction produces both electricity and water (345). Excess air (340) is exhausted from the fuel cell (305). The electricity may then be transferred to an external circuit (350) as useable electricity. Thus, the fuel cell system (305) may be connected in a circuit (350) with an electronic device (355) to provide power for that device (355).

The anode (310) and cathode (320) may be formed by any suitable process, including screen printing, spin-on deposition, colloidal spray deposition, doctor blade methods, or any other method known to those in the art. The electrolyte (315) may be formed by any suitable process, such as sputter deposition.

The cathode (320) may be any cathode capable of converting oxygen or air into oxygen ions, and may include, but is in no way limited to, a mixed conducting perovskite such as lanthanum manganite ($LaMnO_3$). The anode (310) may be any anode capable of releasing electrons to an external circuit when a fuel (325) such as hydrogen or methane is received and reacts with the oxygen ions. The materials used to form the anode (310) may include, but are in no way limited to, a ceramic/metal composite such as an electronically conducting nickel/yttria-stabilized zirconia cermet. The electrolyte (315) may be any oxygen ion conducting electrolyte including, but in no way limited to, zirconia-based electrolytes such as yttria-stabilized zirconia, gadolinium-doped ceria, $Ba_2In_2O_5$, or a (strontium, magnesium)-doped $LaGaO_3$ (LSGM).

Figure 4:
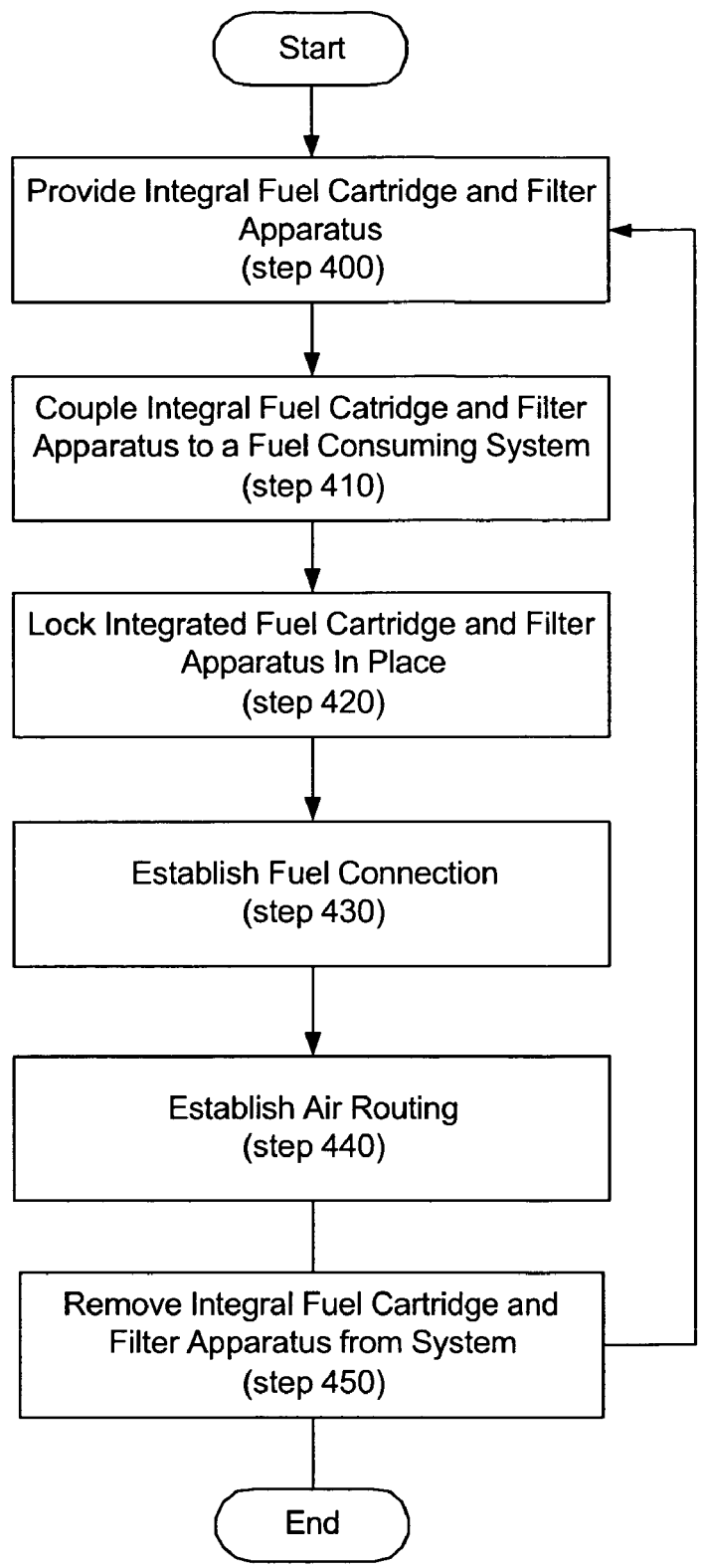
FIG. 4 is a flowchart illustrating a method of using an integral fuel cartridge and filter apparatus according to one exemplary embodiment.

FIG. 4 is a flowchart of a method of using a filter according to the principles described herein. The method provides for simultaneously introducing or replacing a filter with a fuel cartridge. The method begins by providing an integral fuel cartridge and air filter apparatus (step 400). The apparatus includes a fuel cartridge, a filter housing, and a filter. The filter is coupled to the filter housing, and the filter housing and filter are coupled to the fuel cartridge. In addition, a handle is formed on a distal end of the filter housing.

The integral fuel cartridge and filter apparatus is then coupled to a fuel cell system (step 410). This coupling step may be part of a replacement step. Accordingly, the process of replacing the fuel cartridge also entails replacing the filter for the cathode air intake. This coupling process may include inserting the cartridge and using the handle to rotate the integral fuel cartridge and filter apparatus. This locks the integral fuel cartridge and filter apparatus in place (step 420). By coupling the integral fuel cartridge and filter apparatus to the fuel cell system, a fuel connection is established (step 430) between the fuel cartridge and an anode portion of a fuel cell and air routing is established through the filter (step 440) between ambient air and a cathode portion of the fuel cell. By integrating the fuel cartridge and the filter, the replacement interval for the air filter is invisible to the user and facilitates broader user compatible applications.

Additionally, by ensuring that the filter is regularly replaced, the possibilities for air movers that can be used in the system expands because the generated pressure required is reduced since the range of pressure drop variation of the system is effectively reduced. Once the fuel in the fuel cartridge is spent, the integral fuel cartridge and filter apparatus is removed from the fuel cell system (step 450). With the removal of a spent fuel integral fuel cartridge and filter apparatus, the process can begin again. An example of an application of the integral fuel cartridge and filter apparatus is shown in FIG. 5.

Figure 5:
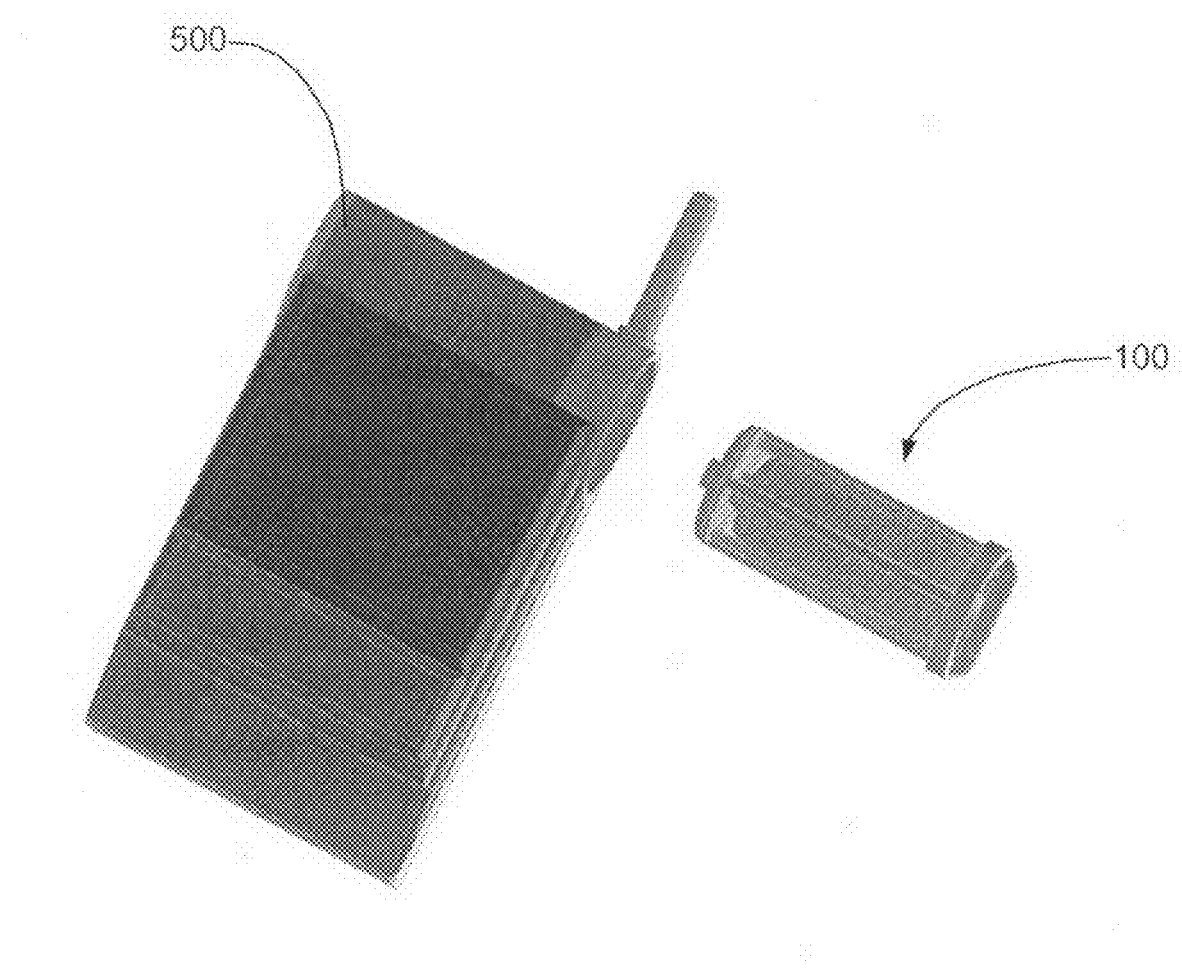
FIG. 5 illustrates an electronic device according to one exemplary embodiment.

FIG. 5 illustrates an electronic device according to one exemplary embodiment. In the illustrated embodiment, the integral fuel cartridge and filter apparatus (100) is coupled to an electronic device, such as a cell phone (500). Accordingly, use of an integral fuel cartridge and filter apparatus allows for the simultaneous introduction or replacement and removal of a fuel cartridge and a filter together in an integral member. This minimizes the number of steps and time required to maintain a fuel cell system in operating condition.

ALTERNATIVE EMBODIMENTS

Figure 6A:
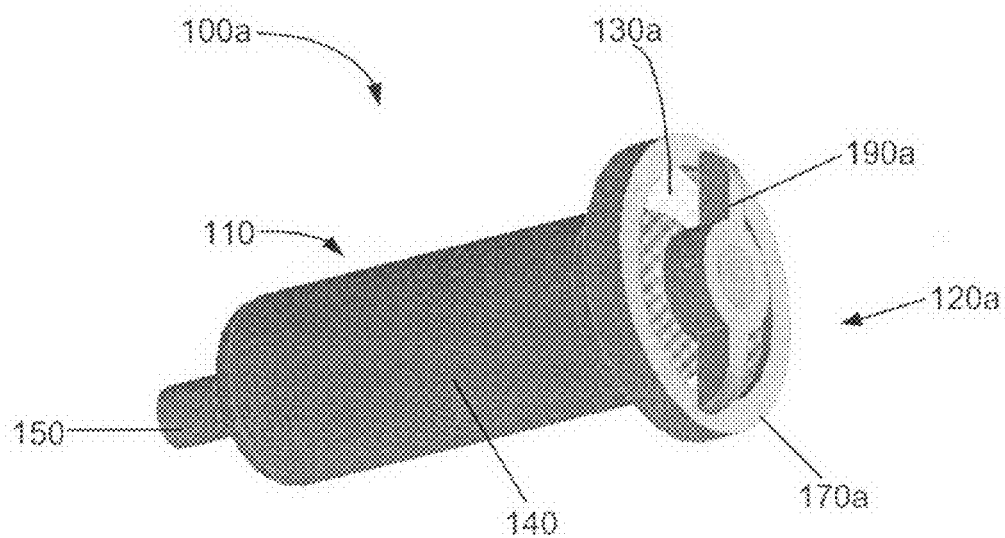
FIG. 6A illustrates an integral fuel cartridge and filter apparatus according to one exemplary embodiment.
Figure 6B:
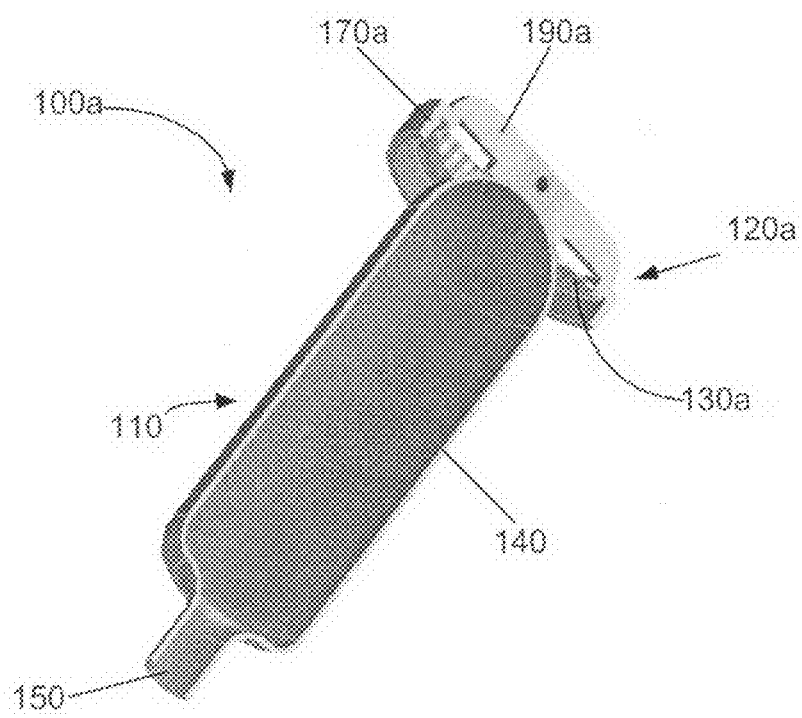
FIG. 6B illustrates an integral fuel cartridge and filter apparatus according to one exemplary embodiment.

FIGS. 6A and 6B illustrate an alternative design for an integral fuel cartridge and filter apparatus (100a) in which the filter housing (120a) is coupled to a distal end of the fuel cartridge (110). The integral fuel cartridge and filter apparatus (100a) generally includes a fuel cartridge (110), a filter housing (120a), and an air filter (130a). The fuel cartridge (110) includes a fuel cylinder (140) and a fitting (150). The filter housing (120a) includes distal end member (170a). The distal end member (170a) of the filter housing (120a) is coupled to the fuel cartridge (110). The air filter (130a) is coupled to the filter housing (120a). A handle (190a) is coupled to, or integrally formed with, the distal end member (170a). The handle (190a) facilitates the coupling of the integral fuel cartridge and filter apparatus (100) to a fuel cell system. By twisting the handle (190a) with respect to a fuel cell system, the fuel cartridge (110) may sealingly engage a fuel cell system (300; FIG. 3). Similarly, the handle (190a) facilitates disengagement and removal of the integral fuel cartridge and filter apparatus (100) from a fuel cell system (300; FIG. 3).

As discussed above, fuel is provided to a fuel cell from the fuel cylinder (140) through the fitting (150). Air is also provided to the fuel cell after flowing through the filter (130a). Accordingly, intake air is drawn through the distal end of the integral fuel cartridge and filter apparatus (100a) through the filter (130a), thereby maximizing the efficiency of the intake system by minimizing pressure drop due to filtering.

Figure 7:
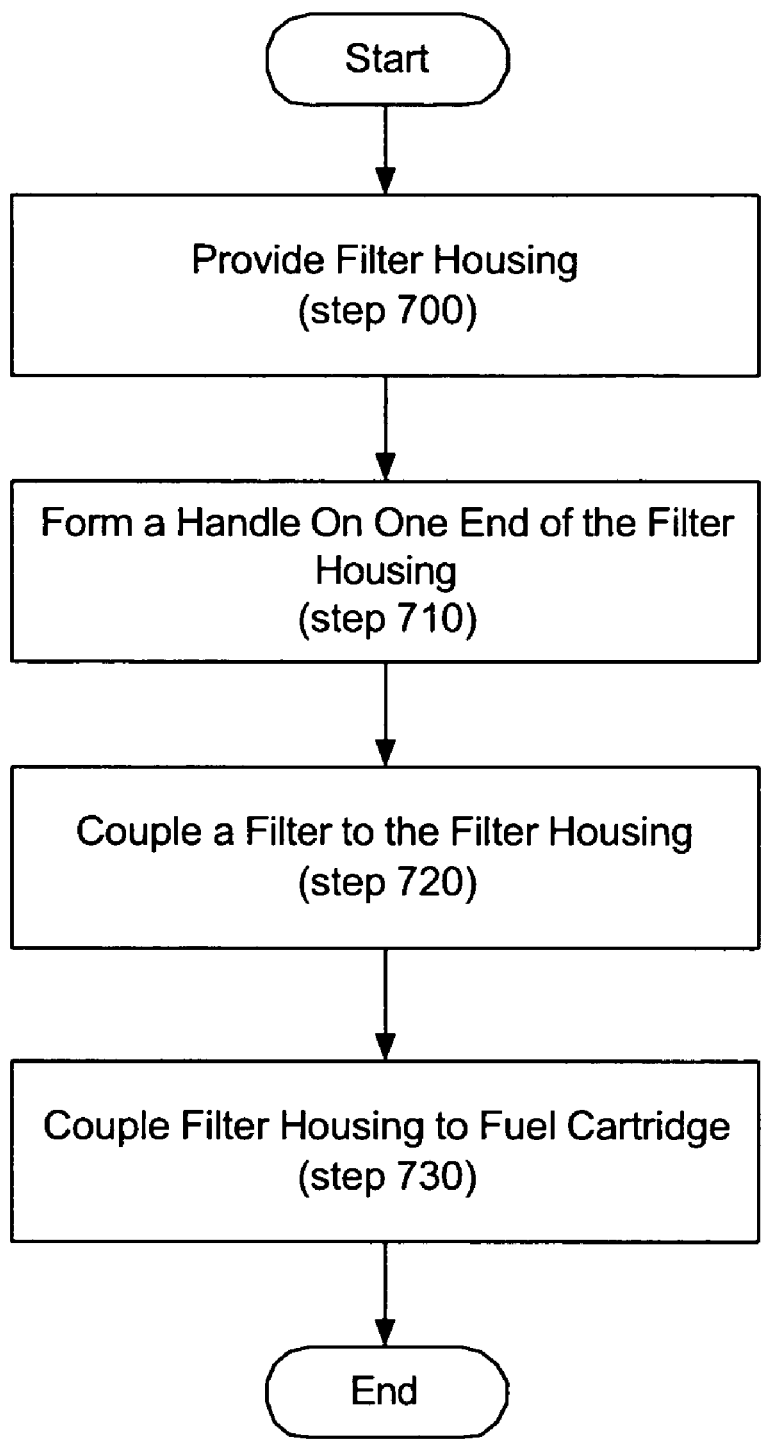
FIG. 7 is a flowchart illustrating a method of forming an integral fuel cartridge and filter apparatus according to one exemplary embodiment.

FIG. 7 is a flowchart illustrating a method of forming an integral fuel cartridge and filter apparatus. The integral fuel cartridge and filter apparatus (100a; FIGS. 6A-B) may be formed according to a method similar to the method discussed above with reference to FIG. 2. The process begins by providing a filter housing (step 700). The filter housing (120a; FIGS. 6A & 6B) may be of any suitable structural material, such as plastic or metal. In addition, a handle may be attached to, or formed on, the distal end of the filter housing (step 710). The handle facilitates the coupling, removal and manipulation of integral fuel cartridge and filter apparatus with respect to a system, such as a fuel cell system.

Next, a filter is coupled to the filter housing (step 720). This coupling may occur as a co-molding process in which the filter and filter housing are integrally formed in a molding process. Additionally the coupling may be accomplished by heat staking the filter to the filter housing. The filter material may be any type of filtering media that provides the filtering required without excessive pressure drop. As before, examples of such materials may include, but are not limited to, spun glass/plastic, a metal fiber, a plastic fiber, expanded foam-like filter material, paper like material, or cloth material. The filter is configured to filter dirty, ambient air before that air enters a fuel cell system. In the embodiment illustrated above, the integral fuel cartridge and filter apparatus includes an expanded foam filter. The filter is held in place either by a plastic porous mesh that is either part of the filter housing or attached to it or by directly being bonded to the filter housing. Once the filter is coupled to the filter housing (step 720), the filter and filter housing are then coupled to a fuel cartridge (step 730). The fuel cartridge may be any vessel capable of containing a fuel suitable for use in a fuel cell.

Accordingly, use of an integral fuel cartridge and filter apparatus allows for the simultaneous introduction or replacement and removal of a fuel cartridge and a filter together in an integral member. This minimizes the number of steps and time required to maintain a fuel cell system in operating condition, thereby facilitating consumer applications. Similarly, the integral fuel cartridge and filter apparatus (100a; FIGS. 6A-B) may be used according to a method similar to that discussed above with reference to FIG. 4.

Figure 8:
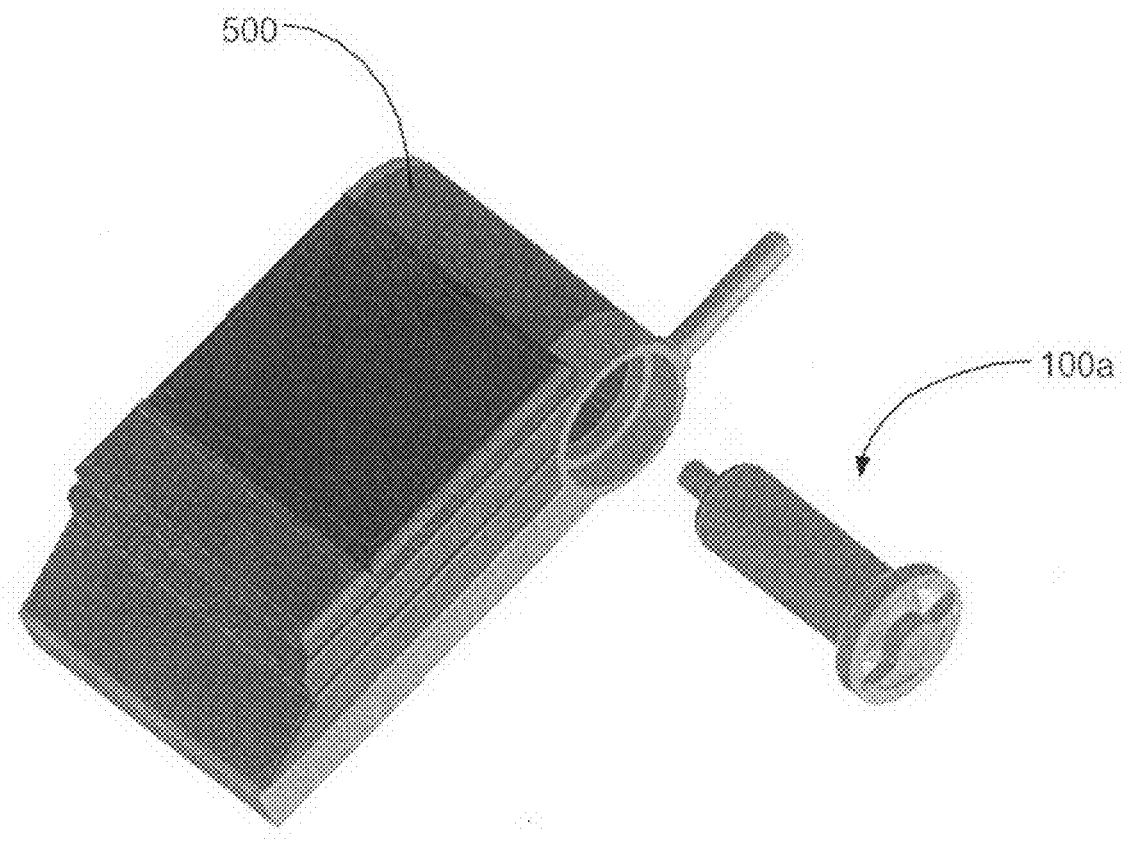
FIG. 8 illustrates an electronic device according to one exemplary embodiment.

FIG. 8 illustrates an electronic device according to one exemplary embodiment. In the illustrated embodiment, the integral fuel cartridge and filter apparatus (100a) is coupled to an electronic device, such as a cell phone (500). Accordingly, a filter and fuel cartridge (130a, 110; FIG. 6A) may be installed and removed in an integral fashion. As discussed, this configuration may expand consumer compatible solutions of fuel cell systems by minimizing the maintenance effort required in order to maintain efficient operating conditions.

Figure 9A:
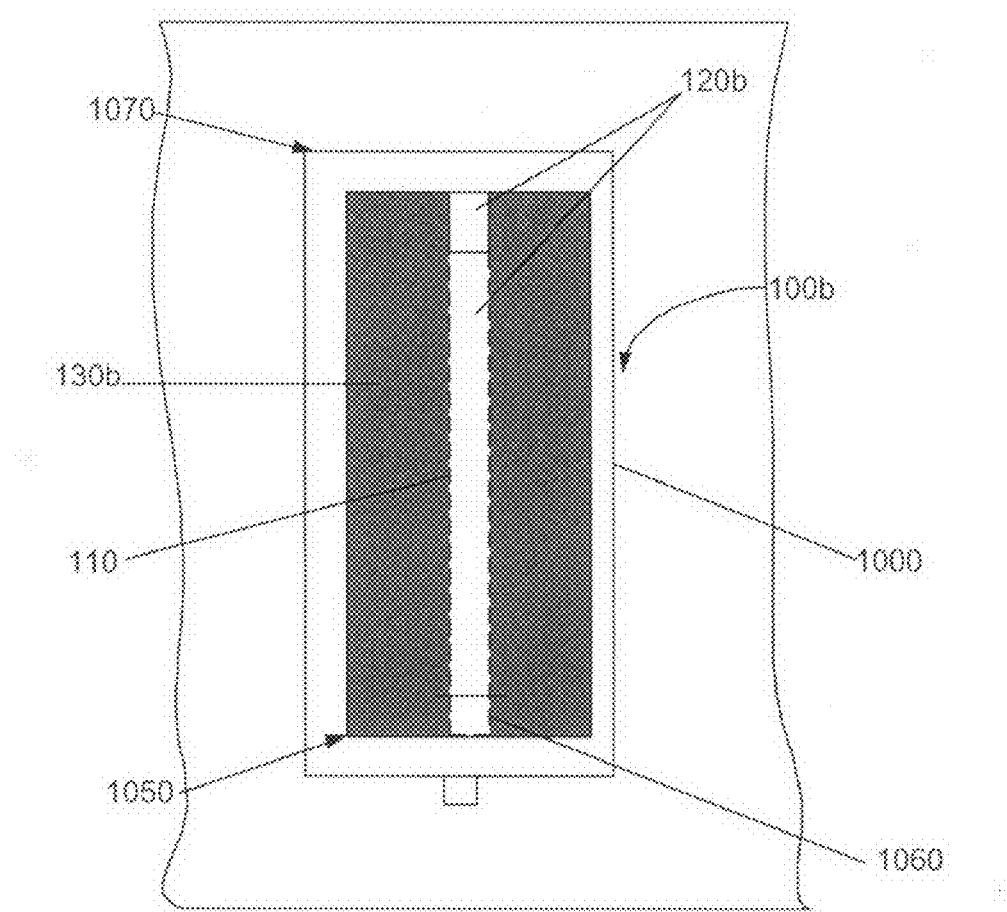
FIG. 9A illustrates a bottom view of an integral fuel cartridge and filter apparatus according to one exemplary embodiment.
Figure 9B:
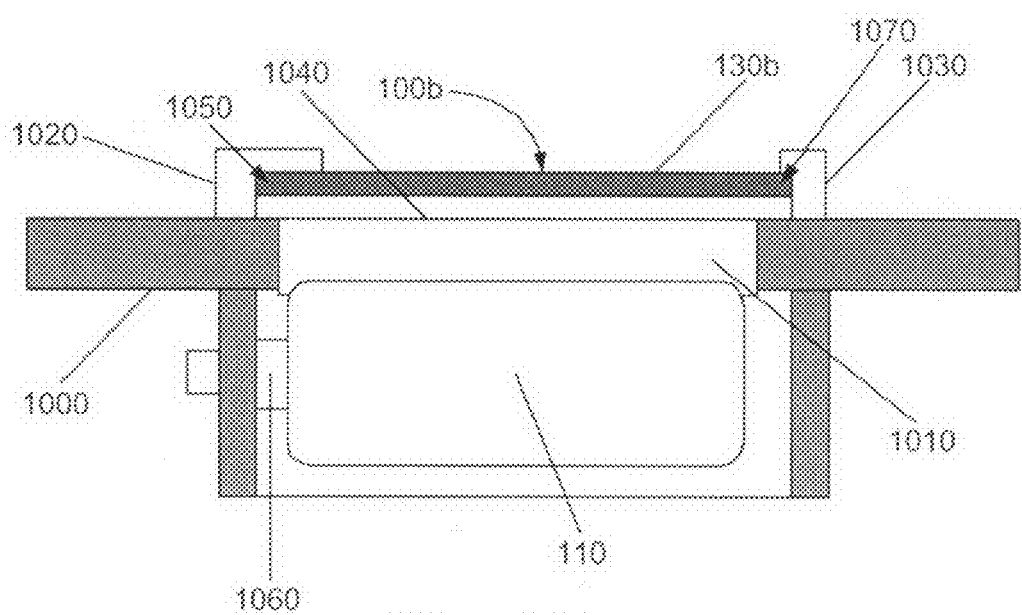
FIG. 9B illustrates a cross section view of an integral fuel cartridge and filter apparatus according to one exemplary embodiment.

FIGS. 9A and B illustrate an integral fuel cartridge and filter apparatus (100b) that is coupled to a fuel cell housing (1000) of a fuel cell system. FIG. 9B is a cross sectional view. FIG. 9A is a view looking upward from underneath the fuel cartridge as illustrated in FIG. 9B. The integral fuel cartridge and filter apparatus (100b) includes a filter housing (120b), filter gasket (1040), and air filter (130b). The filter housing (120b) is a rectangular frame with a crosspiece (shown partially in ghost in FIG. 9A) disposed along one side of the fuel cartridge (110). This crosspiece of the filter housing (120b) is connected to or integrally formed with a rib (1010; FIG. 9B) which secures the filter (130) and filter housing (120b) to a fuel cartridge (110). Filter (130) is coupled to the filter housing (120b).

An opening is defined in the fuel cell housing (1000) with first and second latching tabs (1020, 1030; FIG. 9B) on edges of the opening. The filter gasket (1040) is disposed on, or coupled to, an underside of the filter housing (120b). In order to couple the integral fuel cartridge and filter apparatus (100b) to the fuel cell housing, a proximal end (1050) of the filter housing (120b) and a portion of the filter gasket (1040) are positioned under the first latching tab (1020). The fuel cartridge then engages a fuel gasket (1060) that is located in the fuel cell housing (1000). A distal end (1070) of the integral fuel cartridge and filter apparatus (100b), including a portion of the filter housing (120b) and the filter gasket (1040), is then positioned under the second latching tab (1030). The integral fuel cartridge and filter apparatus (100b) may be rocked into position under the second latching tab (1030). Coupling the integral fuel cartridge and filter apparatus (100b) to the fuel cell housing (1000) establishes fuel and air connections with the fuel cell system in the fuel cell housing (1000) while integrally providing a filter assembly as discussed above.

FIG. 10 illustrates a schematic view of a fuel cell system (300a) that makes use of an integral fuel cartridge and filter apparatus (100c). The integral fuel cartridge and filter apparatus (100c) includes a pre-filter (1100) coupled to, and in fluid communication with, a main filter (130c). In addition, the pre-filter (1100) is in fluid communication with a cooling conduit (1110) that directs pre-filtered air to the fuel cell (305) in order to facilitate cooling. A blower (335a) forces the pre-filtered air over the fuel cell (305). Such a configuration allows for a removal of larger particulates by the pre-filter (1100). Once entering air has passed through the pre-filter (1100), a portion of the air is passed through the main filter (130c) as described above to remove finer particulates. The remaining air is conveyed to the cooling system of a fuel cell (305) where the remaining air facilitates removal of heat generated by the electrochemical reaction.

While the above implementations have been described with reference to a solid oxide fuel cell system, those of skill in the art will appreciate that an integral fuel cartridge and filter apparatus may be utilized with any type of fuel cell system or other fuel and oxidant consuming devices.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. An apparatus, comprising:
   a fuel cartridge; and
   a filter device coupled to said fuel cartridge, said filter device comprising:
      a filter housing; and
      a filter coupled to said filter housing,
   in which said coupled fuel cartridge and filter device are integrated into a single unit, and
   in which said unit is configured to be selectively coupled with or decoupled from a fuel consuming device such that coupling said unit to said fuel consuming device simultaneously couples said fuel cartridge and filter device to said fuel consuming device.

2. The apparatus of claim 1, wherein said filter housing is coupled to distal and proximal ends of said fuel cartridge and said filter at least partially surrounds said fuel cartridge between said distal and proximal ends.

3. The apparatus of claim 2, wherein said filter housing further comprises spacing ribs extending at least partially between said distal and proximal ends.

4. The apparatus of claim 1, wherein said filter housing is coupled to a distal end of said fuel cartridge.

5. The apparatus of claim 4, wherein a proximal end of said fuel cartridge comprises a fuel outlet.

6. The apparatus of claim 1, further comprising a handle coupled to a distal end of said fuel cartridge.

7. The apparatus of claim 1, wherein said filter housing comprises a structural material.

8. The apparatus of claim 7, wherein said structural material comprises plastic.

9. The apparatus of claim 1, wherein said filter comprises a spun glass/plastic filter disposed around said fuel container and said filter and said filter housing are coupled by a plastic porous mesh.

10. The apparatus of claim 1, wherein said unit further comprises a pre-filter coupled to said filter housing.

11. The apparatus of claim 10, wherein said pre-filter is in fluid communication with said filter and said pre-filter is in direct fluid communication with a heat removing system of a fuel cell.

12. A method of forming an integral fuel cartridge and filter apparatus, comprising:
   providing a fuel cartridge;
   coupling a filter housing to said fuel cartridge; and
   coupling a filter to said filter housing,
   in which coupling said filter and filter housing to said fuel cartridge forms a single unit, and
   in which said unit is configured to be selectively coupled to a fuel consuming device such that coupling said unit to said fuel consuming device simultaneously couples said fuel cartridge and filter device to said fuel consuming device.

13. The method of claim 12, wherein coupling said filter housing to said fuel cartridge comprises coupling said filter housing to a distal end of said fuel cartridge.

14. The method of claim 13, further comprising coupling a handle to said filter housing.

15. The method of claim 14, wherein a proximal end of said fuel cartridge comprises a fuel outlet.

16. The method of claim 12, wherein coupling said filter housing to said fuel cartridge comprises coupling said filter housing to a distal end and to a proximal end of said fuel cartridge and partially surrounding said fuel cartridge with said filter between said distal and proximal ends.

17. The method of claim 16, further comprising coupling a handle to said distal end of said filter housing.

18. The method of claim 17, further comprising pre-filtering air to be routed through said filter.

19. The method of claim 18, further comprising directing a portion of said pre-filtered air to cool a fuel consuming device.

20. A method of using a filter, comprising:
   providing a filter;
   coupling said filter to a filter housing; and
   coupling said filter housing to a fuel cartridge;

in which said coupled fuel cartridge and filter housing form a single unit and are configured to be selectively introduced or removed and replaced as a single unit in a fuel consuming device.

21. The method of claim 20, further comprising providing said filter, filter housing, and fuel cartridge in an integral apparatus.

22. The method of claim 21, wherein said coupling of said fuel cartridge to said fuel consuming device simultaneously couples said filter to said fuel consuming device.

23. The method of claim 21, wherein said coupling of said fuel cartridge to said fuel consuming device comprises inserting said fuel cartridge and rotating a handle coupled to said filter housing in order to rotate said integral apparatus.

24. The method of claim 23, wherein said rotating of said handle locks said integral apparatus in place with respect to said fuel consuming device.

25. The method of claim 24, further comprising establishing a fuel connection to said fuel cartridge and an anode portion of a fuel cell.

26. The method of claim 25, further comprising establishing air routing through said filter between ambient air and a cathode portion of said fuel cell.

27. The method of claim 26, further comprising pre-filtering air to be routed through said air filter.

28. The method of claim 27, further comprising directing a portion of said pre-filtered air to cool said fuel consuming device.

29. An apparatus, comprising:
container means for containing a supply of fuel;
coupling means located at a proximal end of said container means configured to selectively couple said container means to a fuel cell system;
air filter means coupled to said container means,
in which said coupled container means and air filter means are integrated into a single unit, and
in which said unit is configured to be selectively coupled to a fuel consuming device such that coupling said unit to said fuel consuming device simultaneously couples said fuel cartridge and filter device to said fuel consuming device.

30. The apparatus of claim 29, wherein said air filter means comprise:
a filter housing coupled to said container means; and
a filter coupled to said filter housing.

31. The apparatus of claim 29, further comprising pre-filtering means.

* * * * *